(12) United States Patent
Mukherjee et al.

(10) Patent No.: US 8,156,241 B1
(45) Date of Patent: Apr. 10, 2012

(54) SYSTEM AND METHOD FOR COMPRESSING DATA TRANSFERRED OVER A NETWORK FOR STORAGE PURPOSES

(75) Inventors: Sandeep Mukherjee, Sunnyvale, CA (US); Jose Mathew, Sunnyvale, CA (US); Vikas Yadav, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 648 days.

(21) Appl. No.: 11/750,276

(22) Filed: May 17, 2007

(51) Int. Cl.
*G06F 15/16* (2006.01)

(52) U.S. Cl. .......................................... 709/236; 710/68

(58) Field of Classification Search .................. 709/232, 709/236; 707/693; 710/68
See application file for complete search history.

(56) References Cited

U.S. PATENT DOCUMENTS

| | | | | |
|---|---|---|---|---|
| 5,568,629 | A | 10/1996 | Gentry et al. | 395/441 |
| 5,774,715 | A | 6/1998 | Madany et al. | 395/612 |
| 5,889,934 | A | 3/1999 | Peterson | 395/182.04 |
| 5,894,588 | A * | 4/1999 | Kawashima et al. | 710/68 |
| 6,108,727 | A * | 8/2000 | Boals et al. | 710/68 |
| 6,397,230 | B1 * | 5/2002 | Carmel et al. | 709/231 |
| 6,526,434 | B1 * | 2/2003 | Carlson et al. | 709/203 |
| 7,127,577 | B2 | 10/2006 | Koning et al. | 711/162 |
| 7,200,603 | B1 | 4/2007 | Hitz et al. | 707/101 |
| 7,237,021 | B2 | 6/2007 | Penny et al. | 709/223 |
| 7,302,543 | B2 * | 11/2007 | Lekatsas et al. | 710/68 |
| 2002/0009136 | A1 * | 1/2002 | Heath | 375/240 |
| 2002/0085631 | A1 * | 7/2002 | Engwer | 375/240 |
| 2004/0058677 | A1 * | 3/2004 | Chang-Hung et al. | 455/426.2 |
| 2007/0088702 | A1 | 4/2007 | Fridella et al. | 707/10 |
| 2007/0094309 | A1 * | 4/2007 | Buckingham et al. | 707/202 |
| 2007/0104113 | A1 * | 5/2007 | Mega et al. | 370/252 |
| 2008/0034268 | A1 * | 2/2008 | Dodd et al. | 714/755 |
| 2008/0095192 | A1 * | 4/2008 | Collette et al. | 370/473 |
| 2008/0225736 | A1 * | 9/2008 | Compton et al. | 370/252 |
| 2008/0267217 | A1 * | 10/2008 | Colville et al. | 370/477 |

OTHER PUBLICATIONS

"Network Appliance™ SnapValut™ Software" 2003 Network Appliance, Inc.
Ziv et al., "A Universal Algorithm for Sequential Data Compression" IEEE Transactions on Information Theory, vol. IT-23, No. 3, May 1977, p. 377-343.
"LZ77 and LZ78" Wikipedia, the Free Encyclopedia, http://en.wikipedia.org/wiki/LZ77.

* cited by examiner

*Primary Examiner* — Ajay Bhatia
(74) *Attorney, Agent, or Firm* — Zilka-Kotab, PC

(57) ABSTRACT

Data is transferred over a network for storage purposes in a way that accommodates systems which are equipped to only handle a predetermined data block size. This is accomplished by transmitting the data using the same data block size regardless as to whether the data is compressed or not. In use, data to be transferred is identified on a first computer. Prior to being transferred to a second computer, it is determined whether the data is to be compressed. If it is determined that the data is not to be compressed, the data is subdivided into a plurality of data blocks with a predetermined size. If it is determined that the data is to be compressed, the data is compressed and subdivided into a plurality of data blocks with the predetermined size. Such data blocks are then transferred to the second computer via the network, for storing the data.

36 Claims, 11 Drawing Sheets

SYSTEM AND METHOD FOR COMPRESSING DATA TRANSFERRED OVER A NETWORK FOR STORAGE PURPOSES

FIELD OF THE INVENTION

The present invention relates to storage systems, and more particularly to network-based storage systems.

BACKGROUND

A storage server is a special purpose processing system used to store and retrieve data on behalf of one or more clients. A file server is an example of a storage server. A file server operates on behalf of one or more clients to store and manage shared files in a set of mass storage devices, such as magnetic or optical storage-based disks or tapes. In various prior art systems, the file server may communicate with the aforementioned clients over a wide area network. One example of such a system includes the Open Systems SnapVault® (OSSV) system available from Network Appliance, Inc.

In use, the file server may incorporate various features such as the generation of certain kinds of data storage images. Image generation may, for example, include mirroring, where a mirror copy of certain data at one location is maintained at another location, snapshots, and/or clones of data. Mirroring of data may be done for various different purposes. For instance, mirroring provides a mechanism for ensuring data availability and minimizing down time, and may be used to provide disaster recovery. In addition, snapshots provide point-in-time images of data, and clones generally provide a writeable image of data, which may be used for various purposes in data operations.

When the foregoing image generation techniques are carried out over a network, data is often subdivided at the client into data blocks which are, in turn, communicated over the network to the associated file server. Due to network bandwidth limitations, this often requires a significant amount of time to complete the desired task, particularly when dealing with large amounts of data. Moreover, limitations with typical file server systems complicate any attempt to leverage known compression techniques.

In particular, most file server systems are equipped to only handle a predetermined data block size. Thus, any attempt to compress the aforementioned data blocks would render data blocks of a different size, which are incapable of being processed by the file server system without a significant overhaul of the system. There is thus a need for addressing these and/or other issues associated with the prior art.

SUMMARY

A system and method are provided for transferring data over a network for storage purposes, in a way that accommodates systems which are equipped to only handle a predetermined data block size. This is accomplished by transmitting the data using the same data block size regardless as to whether the data is compressed or not. In use, data to be transferred is identified on a first computer. Prior to being transferred to a second computer, it is determined whether the data is to be compressed. If it is determined that the data is not to be compressed, the data is subdivided into a plurality of data blocks with a predetermined size. If it is determined that the data is to be compressed, the data is compressed and subdivided into a plurality of data blocks with the predetermined size. Such data blocks are then transferred to the second computer via the network, for storing the data. The aforementioned compression and/or decompression may be performed by a first layer associated with a storage application program. Further, such compression and/or decompression may be transparent to one or more upper and/or lower layers associated with the storage application program by virtue of the fact that, whether the data blocks are compressed or not, such data blocks have the same predetermined size.

In one embodiment involving compression of the data blocks, such data blocks may be organized into data chunks. For example, each data chunk may include a plurality of compressed data blocks. Further, an uncompressed header may be appended to each data chunk indicating a compressed size of the data in the corresponding data blocks.

In an embodiment involving the aforementioned second computer, such second computer receives the data blocks organized as data chunks via the network. In use, it is determined whether the data blocks are compressed. If so, the aforementioned header associated with each data chunk is identified. Utilizing such header, the data blocks are decompressed, after which the data is stored utilizing the second computer.

In still yet additional possible embodiments, the transfer of the data blocks via the network by the first computer may occur in parallel with the compression. Conversely, the receipt of the data blocks by the second computer may occur in parallel with the decompression. Still yet, it should be noted that the first computer may, in one embodiment, include a client computer and the second computer may include a file server. Of course, other embodiments are contemplated where the first and second computers both include file servers, or any other computer for that matter.

DETAILED DESCRIPTION

A system and method are provided for transferring data over a network for storage purposes, in a way that accommodates systems which are equipped to only handle a predetermined data block size. This is accomplished by transmitting the data using the same data block size regardless as to whether the data is compressed or not. In one example of use, a first computer is provided which transfers data over a network in the form of data blocks to be stored by a second computer. For improving an efficiency of such transfer, such data blocks are compressed by the first computer before being transferred over the network. Further, such data blocks are decompressed by the second computer after receipt over the network.

To accomplish this, the compression and/or decompression may be performed by a first layer associated with a storage application program. Further, such compression and/or decompression may be transparent to one or more upper and/or lower layers associated with the storage application program by virtue of the fact that, whether the data blocks are compressed or not, the data blocks have the same predetermined size.

By this feature, the results of the compression may be at least partially transparent to other software and/or hardware components of the first and/or second computers. To this end, in various embodiments, a storage framework of the first and/or second computer does not necessarily have to be significantly altered to accommodate the compression. More information will now be set forth regarding the underlying features with which the foregoing technique is made possible.

Figure 1:
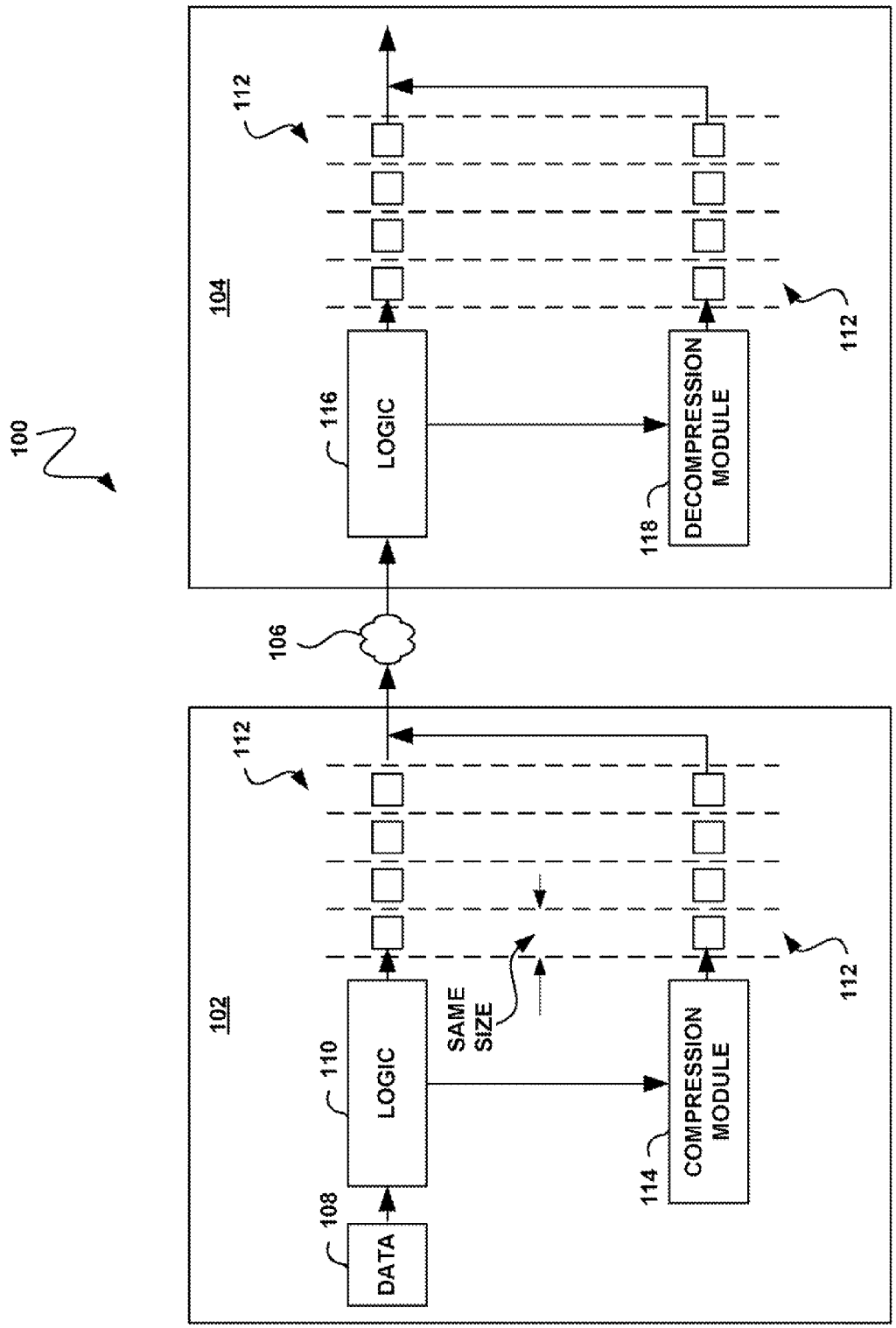
FIG. 1 illustrates a system for transferring data from a first computer to a second computer via a network for storage purposes, in accordance with one embodiment.

FIG. 1 illustrates a system 100 for transferring data from a first computer to a second computer via a network for storage purposes, in accordance with one embodiment. As shown, a first computer 102 is coupled to a second computer 104 via a network. 106. In the context of the present description, it should be noted that the first and second computers 102, 104 may refer to absolutely any computing device. Still yet, the network 106 may include a telecommunications network, local area network (LAN), wireless network, wide area network (WAN) such as the Internet, peer-to-peer network, cable network, and/or any other network for that matter.

In one embodiment, the first computer 102 may include a client computer and the second computer 104 may include a file server. Of course, other embodiments are contemplated where the first and second computers 102, 104 both include file servers. Examples of clients computer include, but are not limited to a workstation, lap-top computer, hand-held computer, mobile phone, personal digital assistant (PDA), peripheral (e.g. printer, etc.), etc. More information regarding one exemplary file server will be set forth later in greater detail.

It should be further noted that, while a single first computer 102 and second computer 104 are shown in FIG. 1, other embodiments are contemplated where multiple first computers 102 transfer data to one or more second computers 104. Further, third computers (not shown) may further be used to receive data from the first and/or second computers 102, 104 via the network 106 or a different network, for that matter.

With continuing reference to FIG. 1, data 108 on the first computer 102 is identified for transfer to the second computer 104. Such identification may occur automatically and/or manually, as desired. Just by way of example, the data 108 may be identified in conjunction with an image generation feature (e.g. mirroring, etc.) adapted for storing a copy of the data 108 for backup purposes. In additional embodiments, a user (e.g. an administrator, etc.) may send the request from the second computer 104 to the first computer 102. Further, the request may be automatically initiated in accordance with a predetermined schedule and/or as a result of a triggering event (e.g. required resources being available, etc.).

Prior to being transferred, it is determined whether the data 108 is to be compressed. Such determination may be made by any desired logic 110. If it is determined that the data 108 is not to be compressed, the data is simply subdivided into a plurality of data blocks 112 with a predetermined size. If it is determined that the data is to be compressed, the data 108 is compressed and subdivided into a plurality of data blocks 112, again with the same predetermined size as shown. The data blocks 112 are then transferred to the second computer 104 via the network 106, for storing the data 108.

The forgoing compression may be accomplished utilizing a compression module 114, in the manner shown. Of course, any compression technique may be employed which results in the data being reduced in size. One non-limiting example of a compression technique includes the well known ZLIB algorithm, which is a variant of the also well known LZ77 algorithms. Such LZ77 algorithms achieve compression by replacing portions of data with references to matching data that has already passed through both an encoder and decoder. A match is typically encoded by a pair of numbers called a length-distance pair. In additional embodiments, other LZ77 variants may be utilized such as the Lempel-Ziv-Welch (LZW) or Lempel-Ziv-Storer-Szymanski (LZSS) algorithms. Again, any compression technique may be used, as desired.

From the perspective of the second computer 104, the data blocks 112 are received and it, is determined whether they are compressed or not (again, utilizing any desired logic 116). More information regarding exemplary ways in which such determination may be made will be set forth hereinafter in greater detail during the description of subsequent figures. If it is determined that the data blocks 112 are compressed, the data blocks 112 are decompressed before the data 108 is stored. This may be accomplished utilizing a decompression module 118, in the manner shown.

As shown in FIG. 1, the data blocks 112 are formed to have the same predetermined size, whether they are compressed or not. By this feature, the results of the compression may be at least partially transparent to other software and/or hardware components of the first computer 102 and/or second computer 104. For example, the compression and/or decompression may be performed by a first layer associated with a storage application program. Further, such compression and/or decompression may be transparent to one or more upper and/or lower layers associated with the storage application program.

In one particular non-limiting example, such compression and/or decompression may be at least partially transparent to one or more upstream and/or downstream hardware or software components (other than the compression/decompression modules 114, 118). As mentioned earlier, this transparency may be provided by virtue of the fact that, whether the data blocks are compressed or not, such data blocks 112 have the same predetermined size. To this end, in various embodiments, a framework of the first and/or second computer 102, 104 does not necessarily have to be significantly altered to accommodate the compression and/or decompression. While the first computer 102 is shown in FIG. 1 to include the compression module 114 and the second computer 104 is shown to include the decompression module 118, it should be noted that the computers may each be equipped with both compression and decompression capabilities such that the roles of the first/second computers 102, 104 may be reversed, etc.

More illustrative information will now be set forth regarding various optional architectures and features of different embodiments with which the foregoing technique may or may not be implemented, per the desires of the user. It should be strongly noted that the following information is set forth for illustrative purposes and should not be consulted as limiting in any manner. Any of the following features may be optionally incorporated with or without the other features described.

Figure 2:
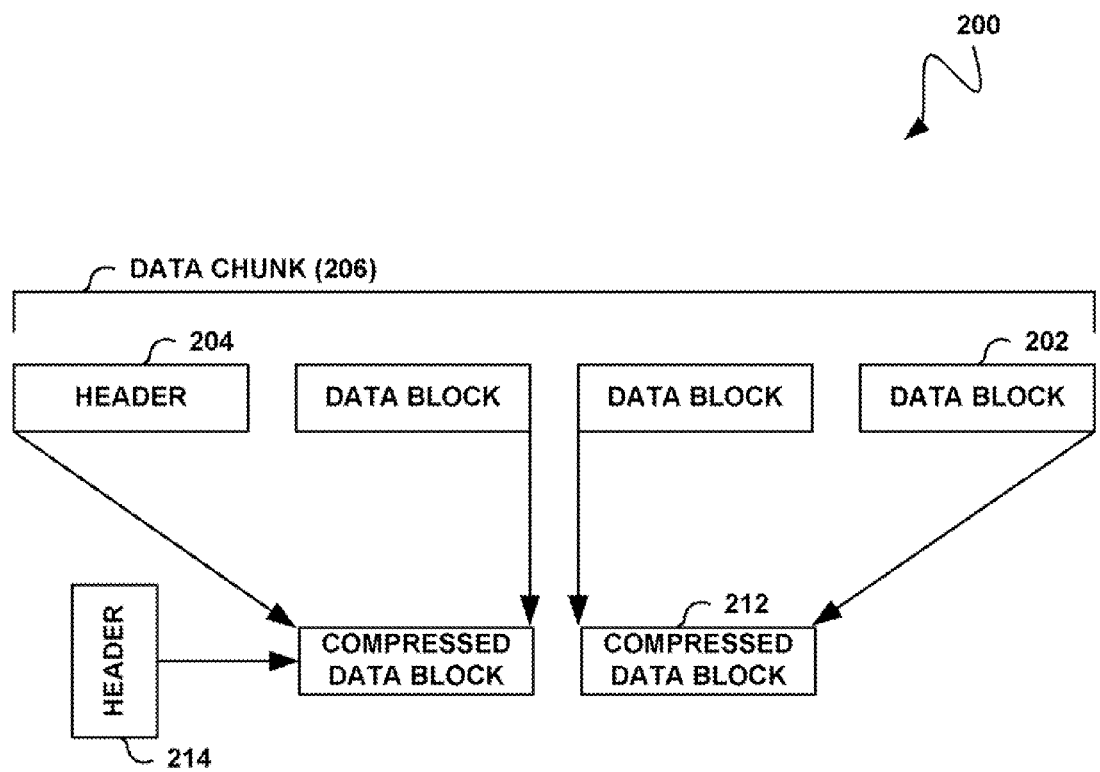
FIG. 2 illustrates a data structure for use in transferring data from a first computer to a second computer for storage purposes, in accordance with another embodiment.

FIG. 2 illustrates a data structure 200 for use in transferring data from a first computer to a second computer for storage purposes, in accordance with another embodiment. As an option, the data structure 200 may be used to transfer data in the context of the system 100 of FIG. 1. Of course, however, it should be noted that the data structure 200 may be used in any desired environment. Further, the definitions provided above equally apply to the present description.

As shown, data to be transferred from a first computer to a second computer may be divided into a plurality of data blocks 202 of a predetermined size. In one exemplary non-limiting embodiment, such predetermined size may be 4 Kb. Of course, it should be noted that such exemplary size is set forth for illustrative purposes only, as any desired size may be employed.

Still yet, the data blocks 202 may be inclusive of a data block header 204. In one possible embodiment, such data block header 204 may include information (e.g. size, location, name, etc.) regarding one or more files associated with the data, etc. Together, the data block header 204 and the data blocks 202 form a data chunk 206. In one embodiment, the data chunk 206 may contain up to a predetermined number (e.g. 512, etc of data blocks 202. Of course, the data block header 204 and the data blocks 202 may adhere to any desired protocol [e.g. logical representation (LREP), etc.].

With continuing reference to FIG. 2, multiple data blocks 202 may be compressed in the form of compressed data blocks 212. As shown, such compressed data blocks 212 have the same predetermined size as each of the data blocks 202. Of course, however, the compressed data blocks 212 include more information (associated with multiple data blocks 202) due to the compression.

Still yet, a compression header 214 is provided in association with the compressed data blocks 212. In one embodiment, one compression header 214 may be provided for each set of one or more compressed data blocks 212 associated with a single data chunk 206, in the manner shown. While the compression header 214 may include any information associated with the compressed data blocks 212 it may, in one embodiment, include a compressed size of the data in the data blocks 202.

For instance, in the example shown in FIG. 2 (where data block size=4 Kb), the length would be 16 Kb. Of course, other embodiments are contemplated where the compression header 214 may include other information such as information about the compression itself, etc. In one embodiment, the compression header 214 may be uncompressed for convenient access upon receipt.

In use, a receiving computer (e.g. the second computer 104 of FIG. 1) may determine whether the data blacks 202 were compressed prior to being transferred, utilizing any desired technique (e.g. an initial negotiation, etc). If it is determined that the data blocks 202 are compressed, the data blocks 202 may be decompressed before the associated data is stored. Further, the information in the compression header 214 may be used to facilitate the decompression process. More information, regarding various exemplary techniques for accomplishing this will be set forth later in greater detail.

Figure 3:
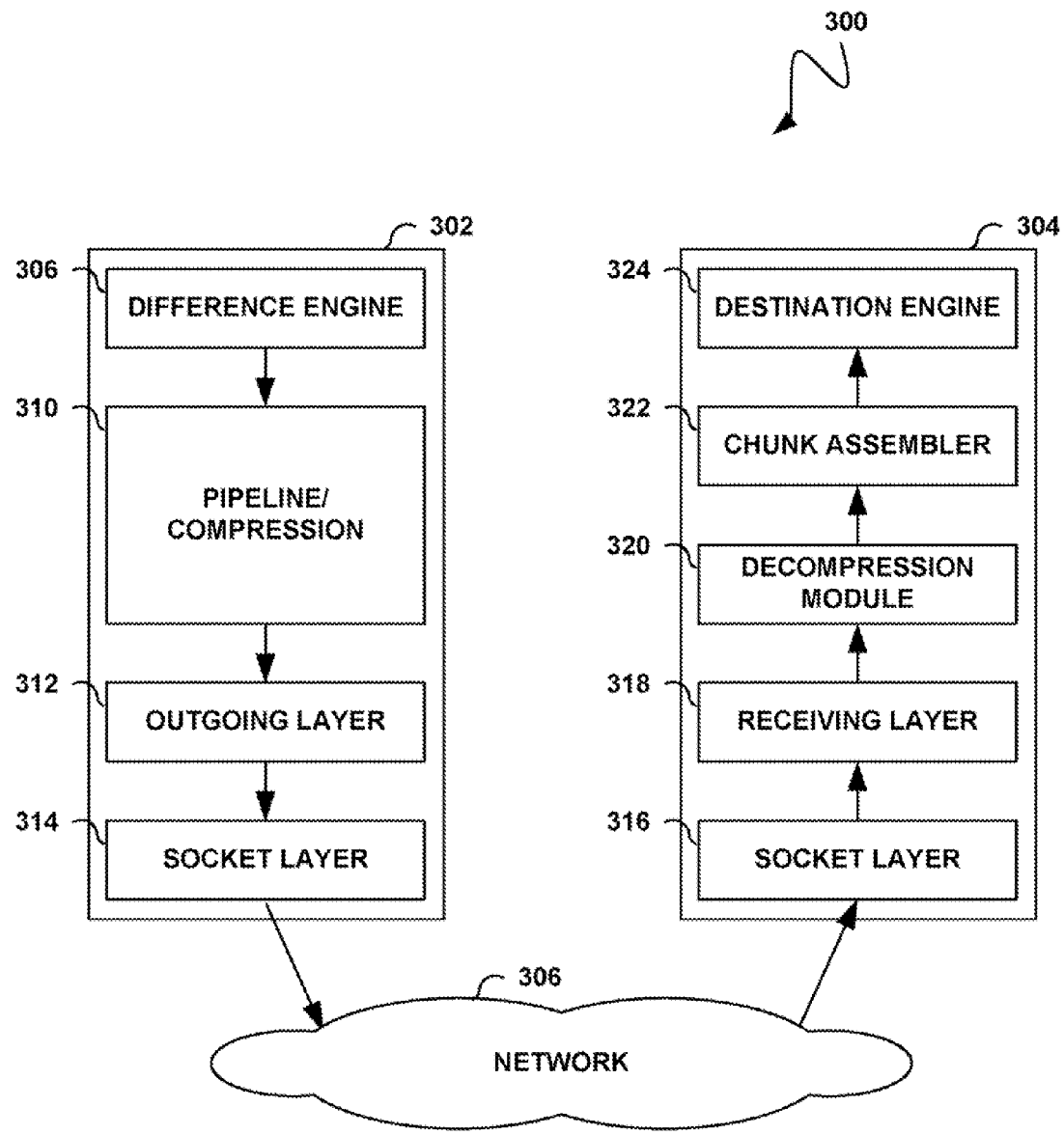
FIG. 3 illustrates a system for use in transferring data from a first computer to a second computer for storage purposes, in accordance with yet another embodiment.

FIG. 3 illustrates a system 300 for use in transferring data from a first computer to a second computer for storage purposes, in accordance with yet another embodiment. As an option, the system 300 may be used in the context of the framework and/or functionality of the previous figures. Of course, however, it should be noted that the system 300 may be used in any desired environment. Again, the definitions provided above equally apply to the present description.

As shown, a first computer 302 is shown to be coupled to a second computer 304 via a network 306. The first computer 302 includes a difference engine 306 for identifying data to be transferred to the second computer 304, for storage purposes. In one embodiment, the difference engine 306 may accomplish this by first transferring a baseline (e.g. complete) set of data, and subsequently identifying a difference between such baseline (or updated baselines) and current data, for transferring only the differential data. Of course, the difference engine 306 may be capable of any other desired application layer processing as well.

The difference engine 306, in turn, feeds a pipeline 310 with associated compression capabilities. Such pipeline 310 receives the data from the difference engine 306 for subdividing the data into data blocks and possibly compressing the same. In one embodiment, the resultant data blocks may adhere to the abovementioned LREP protocol. More information regarding operation of the pipeline 310 according to one possible embodiment will be set forth during the description of FIGS. 5-6.

The pipeline 310 then feeds appropriate data blocks to an outgoing layer 312 (e.g. back-up layer) for further processing in preparation for final network layer processing by a socket layer 314. The socket layer 314 serves to transmit the data blocks to the second computer 304 via the network 306. Upon receipt by the second computer 304, similar components of the second computer 304 process the data blocks. In particular, a socket layer 316 and a receiving layer 318 process the data blocks in manner that is conversely analogous to the processing performed by the socket layer 314 and the outgoing layer 312 of the first computer 302.

With continuing reference to FIG. 3, the data blocks are shown to be fed to a decompression module 320 adapted for selectively decompressing the data blocks. More information regarding operation of the decompression module 320 according; to one possible embodiment will be set forth during the description of FIG. 7. Once decompressed (if required), the data blocks are fed to a chunk assembler 322 such that the data chunks may be reassembled for further processing (e.g. storage) by a destination engine 324.

As mentioned earlier, a size of the data blocks remain the same size regardless as to whether the compression takes place. To this end, the processing of the pipeline 310 and decompression module 320 may be at least partially transparent to the other upstream and downstream components shown in FIG. 3. More information will now be set forth regarding one way in which the first and second computers 302, 304 may initiate a transfer of data.

Figure 4A:
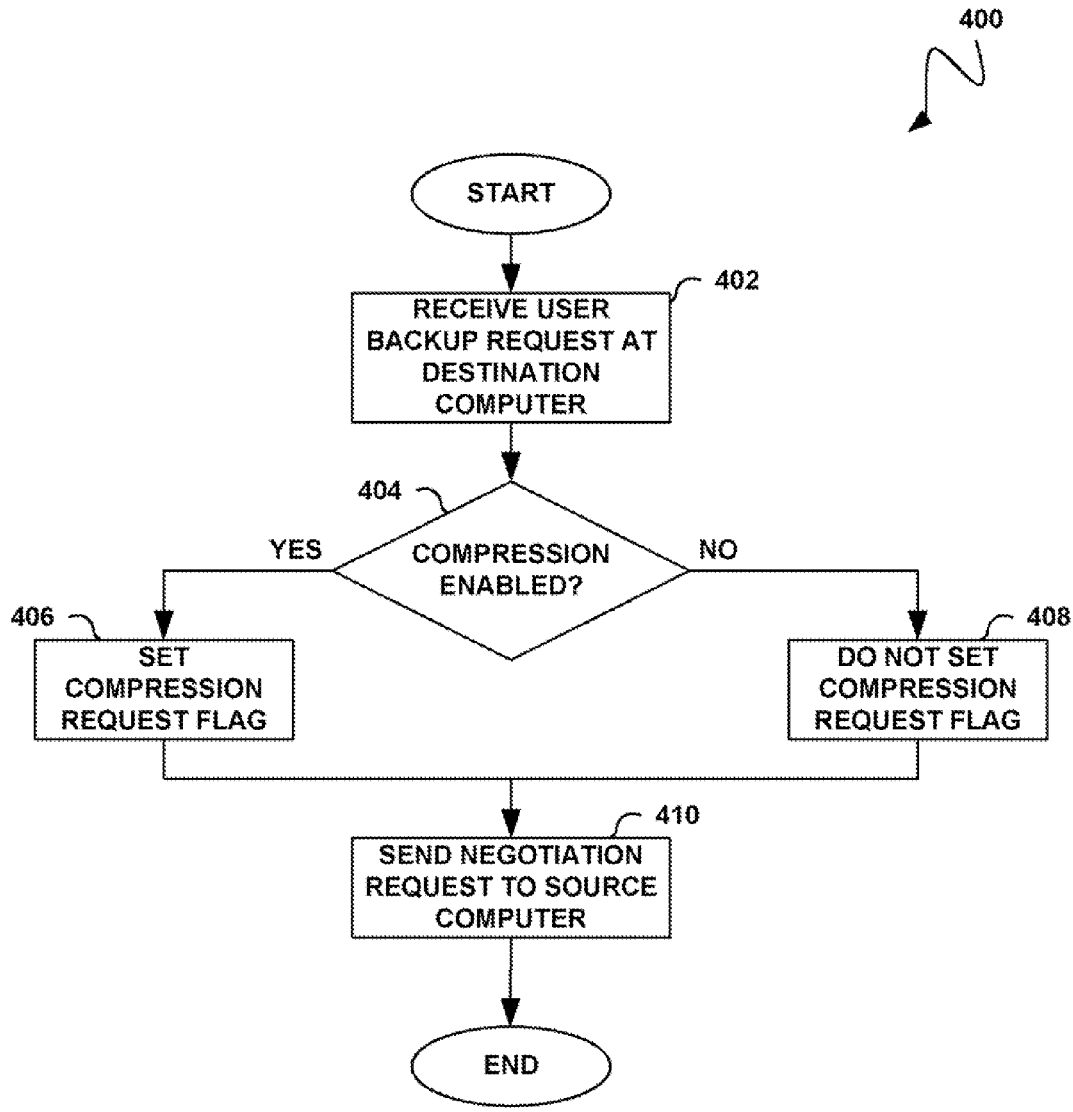
FIGS. 4A-4B illustrate a method for initiating a transfer of data from a first computer to a second computer for storage purposes, in accordance with yet, another embodiment.
Figure 4B:
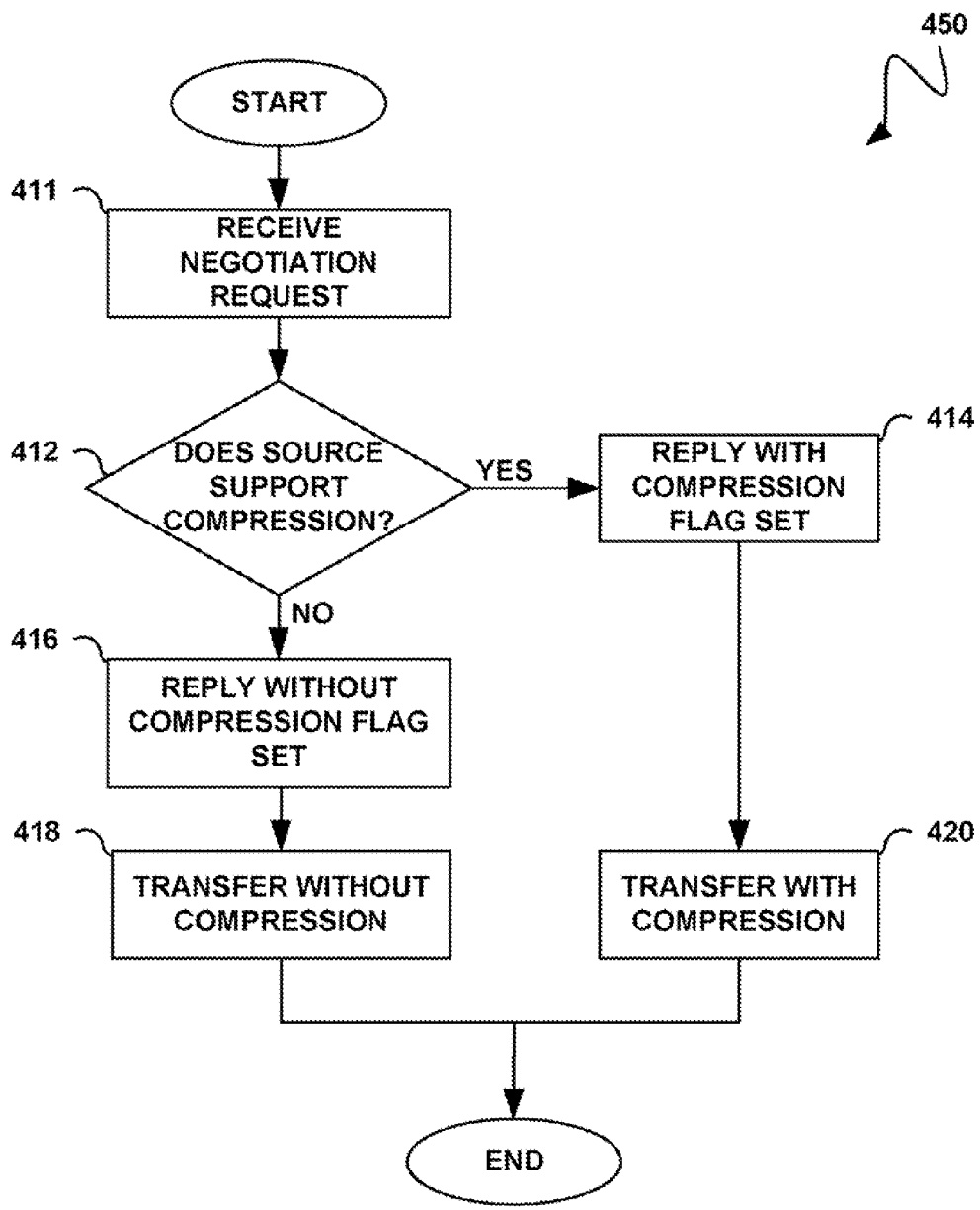

FIGS. 4A-4B illustrate a method 400 for initiating a transfer of data from a first computer to a second computer for storage purposes, in accordance with yet another embodiment. As an option, the method 400 may be used in the context of the framework and/or functionality of the previous figures. For example, the method 400 may be used to transfer data from the first computer 302 to the second computer 304 of FIG. 3 for storage purposes. Of course, however, it should be noted that the method 400 may be performed in any desired environment. Again, the definitions provided above equally apply to the present description.

With reference first to FIG. 4A, a backup request is received at a destination computer (e.g. the second computer 304 of FIG. 3) that is to receive the data. See operation 402. In one embodiment, such request may be user initiated. As mentioned earlier, an administrator may prompt the request, or it may be initiated in accordance with a predetermined schedule or as a result of a triggering event (e.g. required resources being available, etc.). It may further be determined whether compression is to be enabled in conjunction with such data transfer. See decision 404. As an option, such decision may be made via a graphical user interface (GUI) or may even be automatic.

If it is determined that compression is to be enabled in decision 404, the request may be configured to indicate that the data is to be compressed, utilizing a flag. For example, a compression request flag may be set. See operation 406. On the other hand, if it is determined that compression is not to be enabled in decision 404, the compression request flag may not be set. See operation 408.

In one embodiment, the aforementioned flag may include a value of a bit in an integer. For example, in one possible scenario involving one byte which has 8 bits, such byte may thus be used as a set of 8 flags. If the first bit is "1," this may indicate that compression is enabled. On the other hand, if the first bit is "0," such may indicate that compression is not enabled. Of course, other bits may be used for other, unrelated purposes. In another possible implementation, the integer may be 32 bits wide and the compression field may be one of the last bits.

In any case, the negotiation request is sent from the destination computer to a source computer (e.g. the first computer 302 of FIG. 3) from which the data is to be received. Note operation 410.

With reference now to FIG. 4B, the method 400 continues at the source computer in the manner shown. In particular, the negotiation request is received in operation 411. It is then determined whether the source computer supports data compression. See decision 412.

If the source computer supports data compression per decision 412, a reply is sent to the destination computer in response to the negotiation request. The reply may further indicate whether compression of the data is supported. This may be accomplished by setting a compression flag associated with the reply. See operation 414. Further in response to the negotiation request, data transfer may be initiated with compression capabilities enabled, as indicated in operation 420.

On the other hand, if the source computer does not support data compression per decision 412, the reply may be sent without the corresponding compression flag being set. See operation 416. It should be noted that the source computer may not support data compression for a variety of reasons (e.g. inadequate resources may be available, the compression is unwanted, an earlier/inadequate version of a storage application program is being used, etc.). While not shown, the reply may prompt the user at the destination computer to be warned of such lack of compression capabilities. Further in response to the negotiation request, data transfer may be initiated without compression capabilities enabled, as indicated in operation 418.

Figure 5:
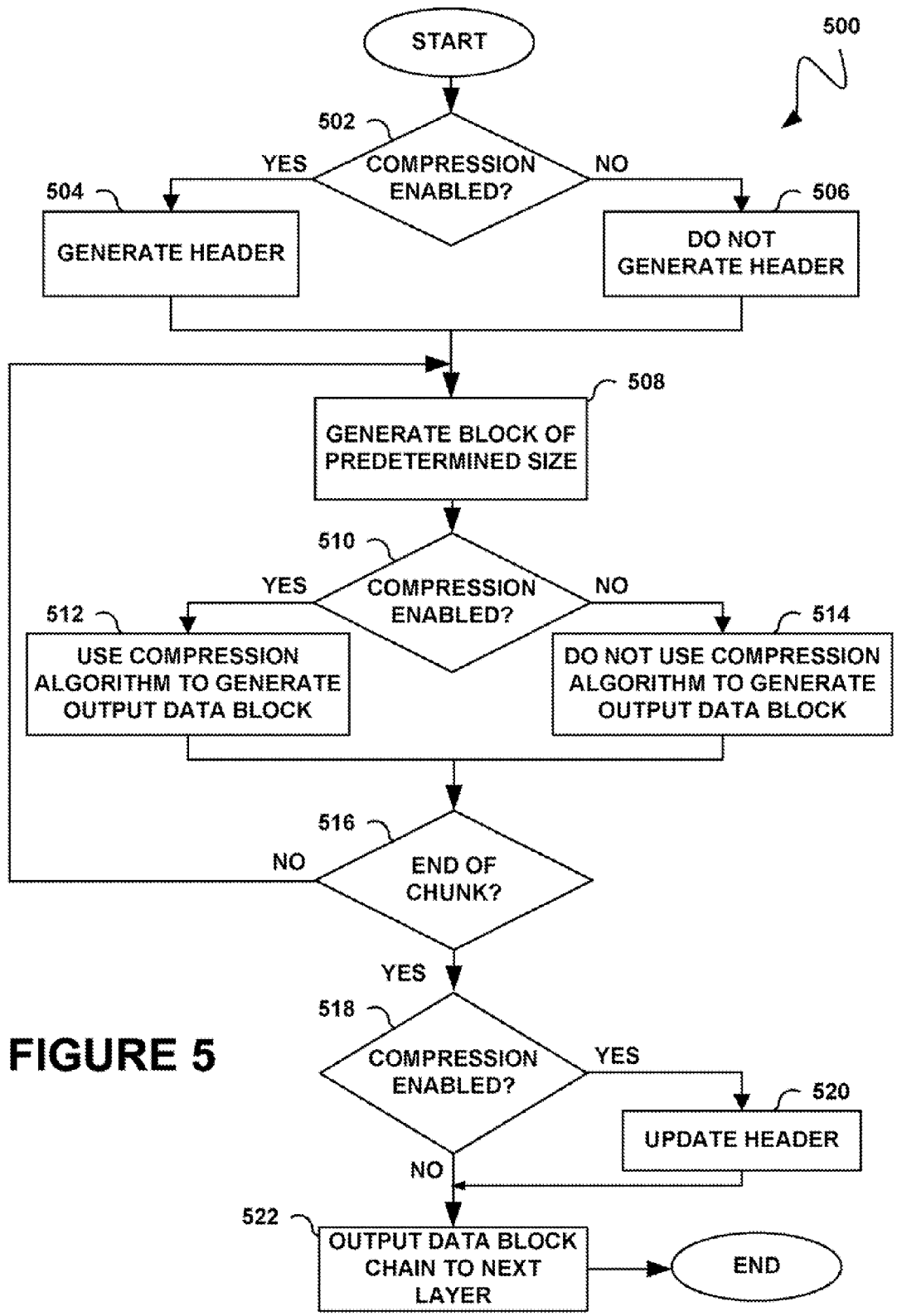
FIG. 5 shows a method for processing data blocks in preparation for data transfer, in accordance with yet another embodiment.

FIG. 5 illustrates a method 500 for processing data blocks in preparation for data transfer, in accordance with yet another embodiment. As an option, the method 500 may be used in the context of the framework and/or functionality of the previous figures. For example, the method 500 may correspond with operation of the pipeline 310 of FIG. 3 and the manner in which such component processes the data on a data chunk-by-data chunk basis. Of course, however, it should be noted that the method 500 may be carried out in any desired environment. Again, the definitions provided above equally apply to the present description.

As shown, it is first determined whether compression is enabled, as indicated in operation 502. In one embodiment, such determination may be made as a function of the request received from a destination computer. See operation 411 of FIG. 4B, for example.

if compression is enabled per decision 502, a header (e.g. compression header 214 of FIG. 2) may be generated, per operation 504. However, if compression is not enabled per decision 502, no such header may be generated. See operation 506. As mentioned earlier, such header may remain uncompressed and be appended to a chunk of data before data transfer for indicating, among other things, the size of the corresponding compressed chunk.

in any case, the method 500 generates a data block of a predetermined size from data to be transferred. See operation 508, in one possible embodiment, the compression procedure may generate data with a size that is less than that of the original uncompressed data. Further, as will soon become apparent, the size of the compressed data for a given uncompressed data block may not necessarily be able to be calculated beforehand. As mentioned earlier during the description of FIG. 2, a first data block may contain a data block header, etc.

With continuing reference to FIG. 5, if compression is enabled (per decision 510), a compression algorithm is performed on the data block, as noted in operation 512. More information regarding operation 512 according to one possible embodiment will be set forth during the description of FIG. 6. On the other hand, if no compression is enabled (per decision 510), the compression algorithm is not applied, as noted in operation 514.

It is then determined whether a sufficient number of data blocks have been generated to constitute a full data chunk. See decision 516. One exemplary compressed data chunk was referenced during the description of FIG. 2. Of course, such determination depends on a predetermined size of the data chunk. If a data chunk has not yet been received, operation 508, etc. is repeated. To this end, a chain, of compressed or uncompressed data blocks are generated.

Assuming that an end of a full data chunk has been reached per decision 516, it is again determined if compression is enabled per decision 518. If so, the header generated in 504 is updated to reflect a compressed size of the data blocks associated with the current data chunk. See operation 520. Such update may be required since the size of the data chunk may not necessarily be known when the header is originally generated in operation 504.

In any case, the chain of data blocks may be output to a next layer (e.g. outgoing layer 312 of FIG. 3). Note operation 522. Of course, the method 500 of FIG. 5 may be repeated for handling any number of chunks (depending on a size of data to be transferred). In one embodiment, the transfer of the data blocks via the network by operation 522 may occur in parallel with the compression of operation 514 for efficiency purposes.

Figure 6:
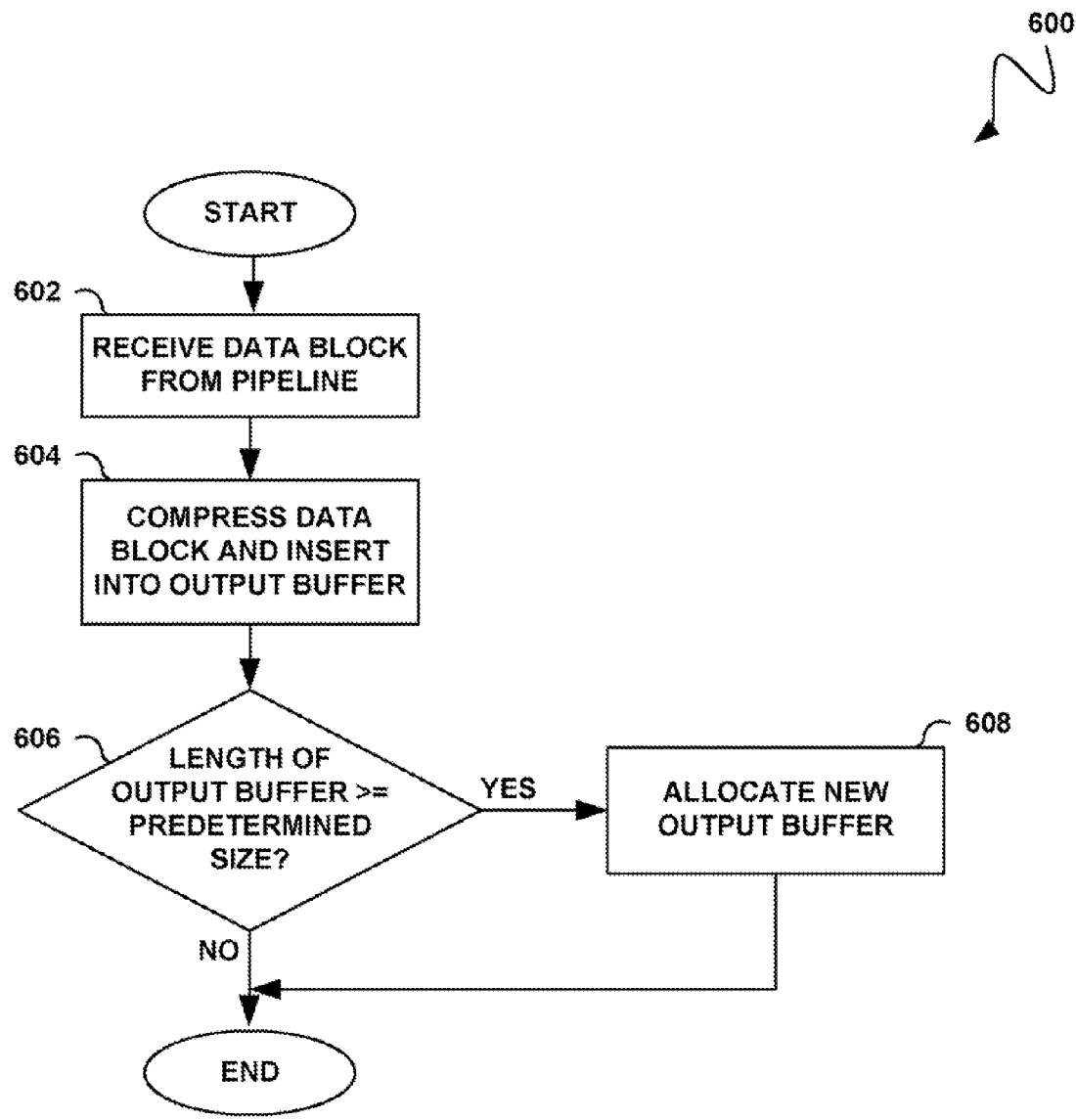
FIG. 6 illustrates a method for compressing data blocks in preparation for data transfer, in accordance with yet another embodiment.

FIG. 6 illustrates a method 600 for compressing data blocks in preparation for data transfer, in accordance with yet another embodiment. As an option, the method 600 may be used in the context of the framework and/or functionality of the previous figures. For example, the method 600 may correspond with the operation 514 of the pipeline shown in FIG. 5.

As shown in operation 602, a data block may be received from an appropriate source (e.g. from the pipeline 310 of FIG. 3). Further, such data block may be compressed and appended to an output buffer, as indicated in operation 604. Such output buffer has a predetermined size corresponding to a desired data block size. If such output buffer is a first output buffer associated with a particular data chunk, the output buffer may first receive the uncompressed compression header (see operation 504 of FIG. 5), before receiving compressed data blocks, etc.

It is then determined in decision 606 whether a length of the current output buffer has reached the predetermined size. If so, a new output buffer may be allocated. See operation 608. By this functionality, the iterative process involving operations 508-516 of FIG. 5 results in compressed data blocks being dumped into the output butler (when compression is enabled), until the output buffer is full. When this happens, a new output buffer is allocated per operation 608 and the process continues, in the manner shown.

Figure 7:
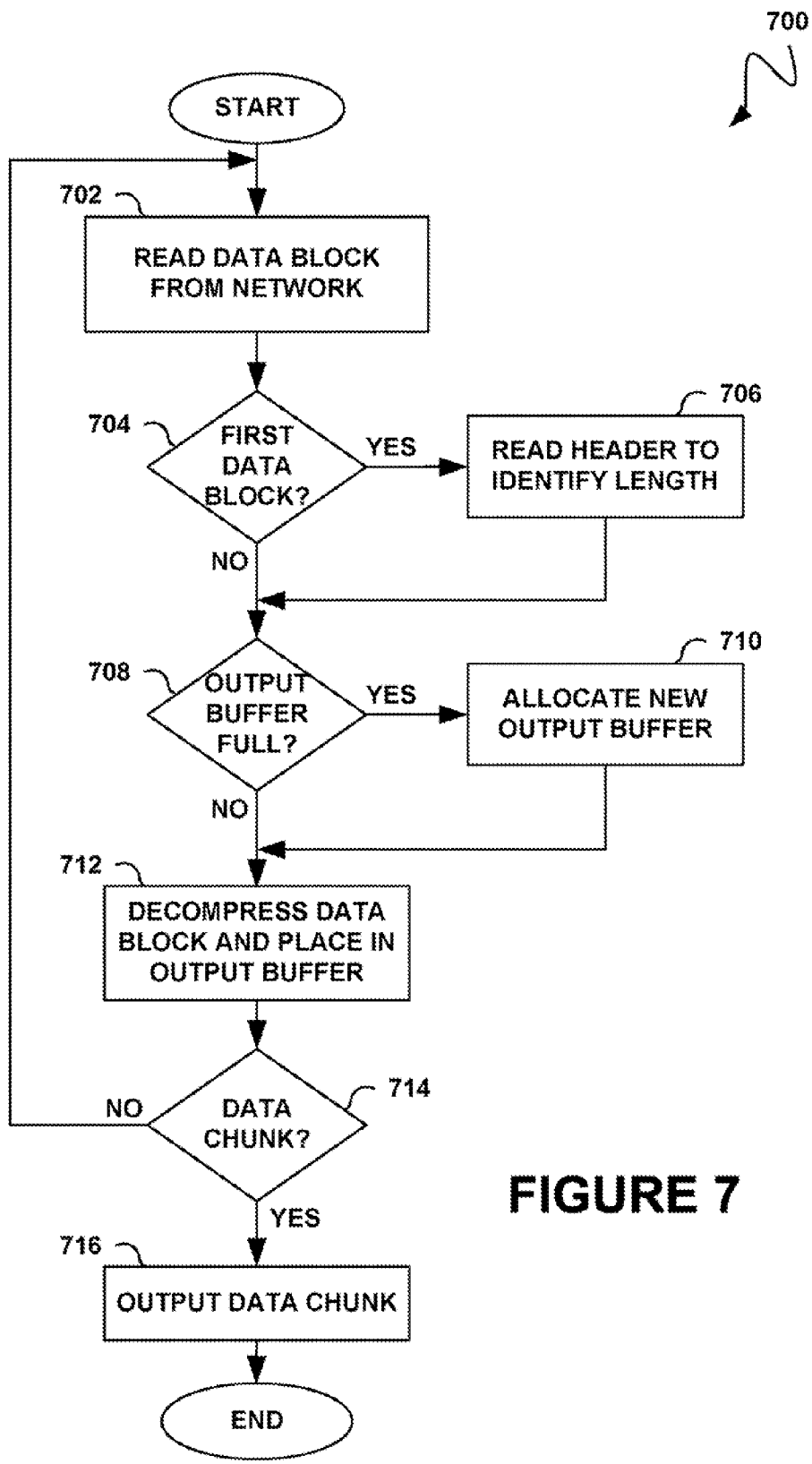
FIG. 7 illustrates a method for decompressing: compressed data blocks received over a network, in accordance with yet another embodiment.

FIG. 7 illustrates a method 700 for decompressing compressed data blocks received over a network, in accordance with yet another embodiment. As an option, the method 700 may be used in the context of the framework and/or functionality of the previous figures. For example, the method 700 may correspond with operation of the decompression module 320 of FIG. 3. Of course, however, it should be noted that the method 700 may be used in any desired environment. Again, the definitions provided above equally apply to the present description.

It should be noted that the method 700 correlates with operation when received data is compressed. To this end, the method 700 may not necessarily be used when data blocks are not compressed. In one embodiment, this determination may be made based on a reply (e.g. see operations 414 and 416 of FIG. 4B) to a request made by a destination computer. In other words, the destination computer may have knowledge of the compression state of incoming data blocks based on a reply to a request for such data.

As shown, a data block may be read from the network (or tape, etc.) in operation 702. If such data block is the first block per operation 704, a header (e.g. the compression header 214 of FIG. 2) is read to identify a compressed length of the data chunk associated with the subsequent incoming data blocks. Note operation 706.

As indicated in decision 708, it is determined whether an output buffer of a predetermined size (e.g. same as the size of the output buffer of operation 604 of FIG. 6) is full. If so, a new output buffer may be allocated. See operation 710.

Next, the data block is decompressed and placed in the currently allocated output buffer. See operation 712. As an option, the decompression of operation 712 may occur in parallel with the reading of data blocks in operation 702.

It is then determined whether a full data chunk has been received in decision 714. Such determination may be made by simply comparing the compressed size of data blocks received thus far with the length identified from the compression header in operation 706.

If such size has not been reached (and thus the incoming, data blocks are associated with the same data chunk), operations 702-712 may be repeated in the manner shown. In contrast, if such size has been reached, the data chunk may be output to a subsequent processing module (e.g. the destination engine 324 of FIG. 3). Note operation 716. Of course, the method 700 of FIG. 7 may be repeated for handling any number of chunks (depending on the size of data being transferred).

Figure 8:
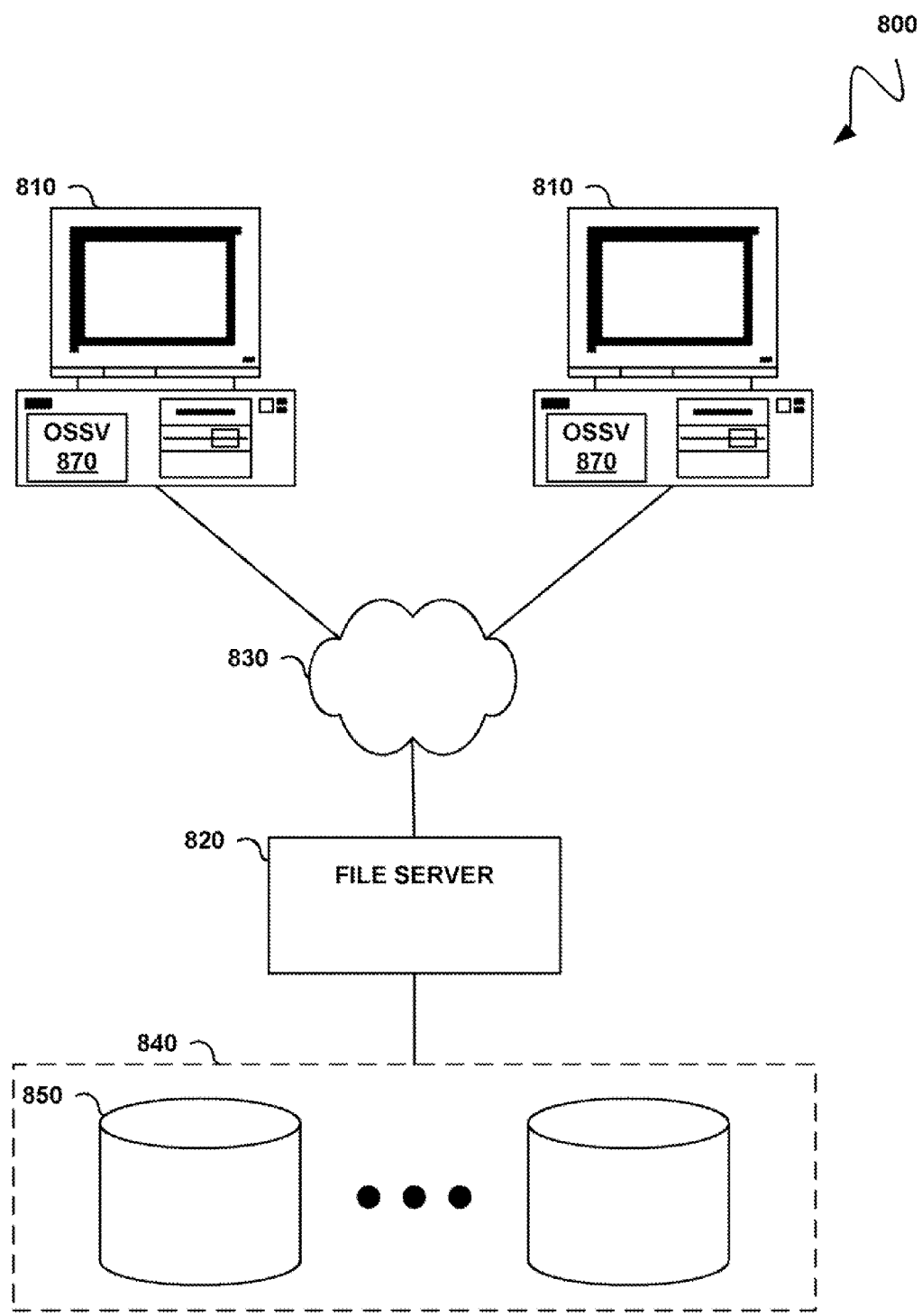
FIG. 8 is an illustration of a network environment in which an embodiment may be implemented.

FIG. 8 is an illustration of a network environment 800 in which an embodiment may be implemented. As an option, the network environment 800 may represent one possible implementation of the system 100 of FIG. 1. Of course, however, it should be noted that the network environment 800 may be used in any desired environment and incorporate any one or more of the features described in the previous figures.

Of course, the various embodiments described herein are not limited to any particular environment, and may be implemented in various storage processes. In the present illustration, the storage system includes a storage server, such as a file server 820. The file server 820 is coupled with a storage subsystem 840, which includes a set of mass storage devices 850, and to a set of clients 810 through a network 830, such as a local area network (LAN) or other type of network. Each of the clients 810 may be, for example, a conventional personal computer (PC), workstation, or any of the other example clients set forth earlier.

The storage subsystem 840 is managed by the file server 820. For example, the file server 820 may receive and respond to various read and write requests from the clients 810, directed to data stored in or to be stored in the storage subsystem 840. The mass storage devices 850 in the storage subsystem 840 may be, for example, magnetic disks, optical disks such as compact disks-read only memory (CD-ROM) or digital versatile/video disks (DVD)-based storage, magneto-optical (MO) storage, tape-based storage, or any other type of non-volatile storage devices suitable for storing large quantities of data.

The file server 820 may have a distributed architecture; for example, it may include separate N-module (network module) and D-module (data module) components (not shown). In such an embodiment, the N-module is used to communicate with the clients 810, while the D-module includes the file system functionality and is used to communicate with the storage subsystem 840. In another embodiment, the file server 820 may have an integrated architecture, where the network and data components are all contained in a single box or unit. The file server 820 further may be coupled through a switching fabric to other similar storage systems (not shown) that have their own local storage subsystems. In this way, all of the storage subsystems can form a single storage pool, to which any client of any of the storage systems has access.

In one possible embodiment, one or more instances of the Open Systems SnapVault® (OSSV) system 870 available from Network Appliance, Inc. may be installed on one or more of the clients 810 for carrying out the functionality of FIGS. 4B, 5, and 6. Further, the file server 820 may be equipped with hardware and/or software for carrying out the functionality of FIGS. 4A and 7.

Figure 9:
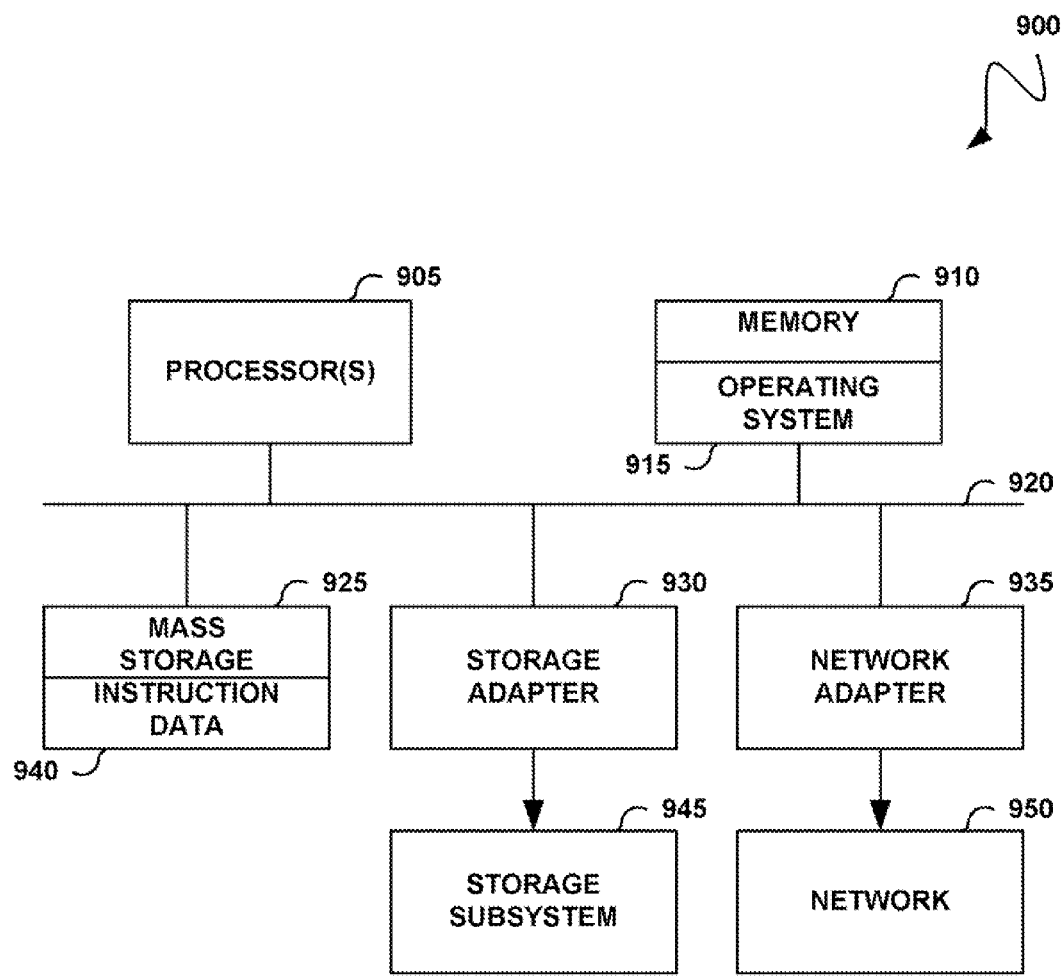
FIG. 9 is a block diagram illustrating an architecture of a file server that may include an embodiment.

FIG. 9 is a block diagram illustrating an architecture of a file server 900 that may include an embodiment. In one embodiment, the file server 900 may represent the file server 820 of FIG. 8. Of course, however, it should be noted that the file server 900 may be implemented in any desired environment and incorporate any one or more of the features described in the previous figures.

The file server 900 includes one or more processors 905 and memory 910 coupled to a interconnect 920. The interconnect 920 shown in FIG. 9 is an abstraction that represents any one or more separate physical buses, point-to-point connections, or both connected by appropriate bridges, adapters, or controllers. The interconnect 920, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 905 may include central processing units (CPUs) of the file server 900 and, thus, control the overall operation of the file server 900. In certain embodiments, the processor(s) 905 accomplish this by executing software stored in memory 910. The processor(s) 905 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 910 is or includes the main memory of the file server 900. The memory 910 represents any form of random access memory (RAM), read-only memory (ROM), flash memory, or the like, or a combination of such devices. In use, the memory 910 stores, among other things, the operating system 915 of the file server 900.

Also connected to the processor(s) 905 through the interconnect 920 may be one or more internal mass storage devices 925, a storage adapter 930 and a network adapter 935. The internal mass storage devices 925 may be or include any medium for storing large volumes of instructions and data 940 in a non-volatile manner, such as one or more magnetic or optical-based disks, which includes, for example, a non-transitory computer readable medium. The storage adapter 930 allows the file server 900 to access a storage subsystem 945 and may be, for example, a Fibre Channel adapter or a SCSI adapter. The storage adapter 930 may interface with a D-module portion of the file server. The network adapter 935 provides the file server 900 with the ability to communicate with remote devices, such as clients, over a network 950 and may be, for example, an Ethernet adapter. The network adapter 935 may interface with an N-module portion of the file server 900.

Figure 10:
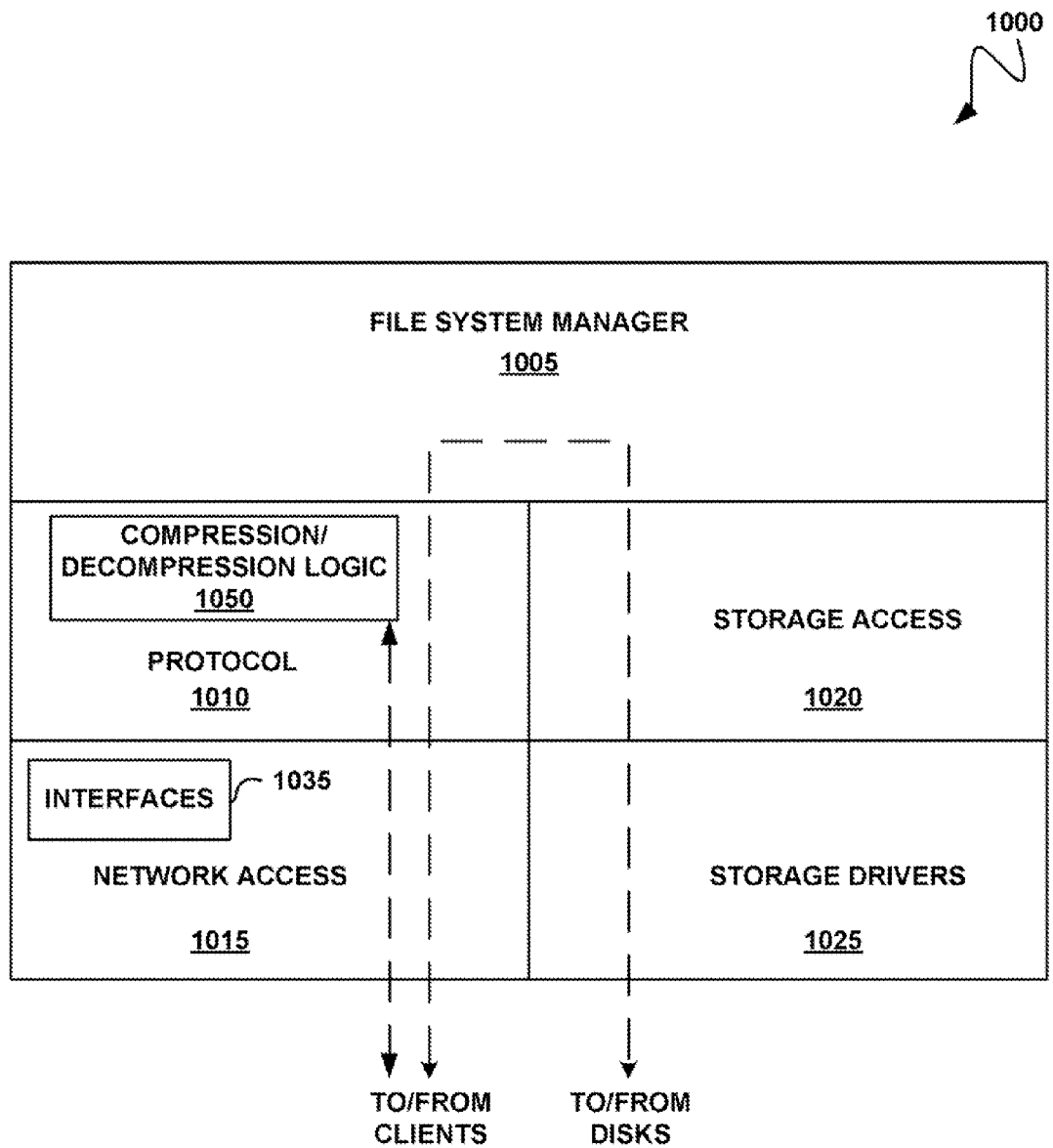
FIG. 10 illustrates an example of an operating system of a file server according to one possible embodiment.

FIG. 10 illustrates an example of the operating system 1000 of a file server according to one possible embodiment. As an option, the operating system 1000 may be installed on the file server 900 of FIG. 9. Of course, however, it should be noted that the operating system 1000 may be used in any desired environment and incorporate any one or more of the features described in the previous figures.

As shown, the operating system 1000 includes several modules, or "layers." These layers include a file system manager 1005. The file system manager 1005 is software that keeps track of the directory structure (hierarchy) of the data stored in a storage subsystem and manages read/write operations on the data (i.e. executes read/write operations on the disks in response to client requests).

The operating system 1000 also includes a protocol layer 1010 and an associated network access layer 1015, to allow a file server to communicate over a network to other systems, such as clients. The protocol layer 1010 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 1015 includes one or more drivers, which implement one or more lower-level protocols to communicate over the network, such as Ethernet. Interactions between clients and mass storage devices (e.g. disks, etc.) are illustrated schematically as a path, which illustrates the flow of data through the operating system 1000.

The operating system 1000 further includes a storage access layer 1020 and an associated storage driver layer 1025 to allow a file server to communicate with a storage subsystem. The storage access layer 1020 implements a higher-level disk storage protocol, such as RAID, while the storage driver layer 1025 implements a lower-level storage device access protocol, such as Fibre Channel Protocol (FCP) or SCSI. In one embodiment, the storage access layer 1020 may implement a RAID protocol, such as RAID-4 or RAID-DP™ (RAID double parity for data protection provided by Network Appliance, Inc.), and therefore may alternatively be referred to as RAID layer 1020.

In use, requests for data transfers may be sent and replies may be received via the protocol layer 1010 and the associated network access layer 1015. Further, in an embodiment where both a source and destination computer includes a file server, compression/decompression logic 1050 for carrying out the compression and/or decompression may be carded out by the protocol layer 1010, as shown.

The foregoing description has set forth only a few of the many possible implementations. For this reason, this detailed description is intended by way of illustration, and not by way of limitations. Variations and modifications of the embodiments disclosed herein may be made based on the description set forth herein, without departing from the scope and spirit of the present application.

It is only the following claims, including all equivalents, that are intended to define the scope of the various embodiments. Moreover, the embodiments described above are specifically contemplated to be used alone as well as in various combinations. Accordingly other embodiments variations and improvements not described herein are not necessarily excluded.

What is claimed is:

1. A method, comprising:
identifying data on a first computer to be transferred to a second computer via a network, for being stored by the second computer, the data comprising a size different from a predetermined size used by a storage application of the first computer;
determining whether the data is to be compressed prior to being transferred;
if it is determined that the data is not to be compressed, subdividing by the storage application the data into a plurality of data blocks to result in the plurality of data blocks comprising the predetermined size;
if it is determined that the data is to be compressed,
compressing, by the storage application, the data to result in compressed data having a compressed size different from the predetermined size used by the storage application, and
subdividing, by the storage application, the compressed data into a plurality of data blocks to result in the plurality of data blocks comprising the predetermined size;
determining that a portion of the data blocks are sufficient to constitute a full data chunk based on a predetermined size of the full data chunk;
organizing the portion of the data blocks into the full data chunk; and
transferring the portion of the data blocks each comprising the predetermined size and constituting the full data chunk from the first computer to the second computer using the storage application via the network, for storing the plurality of data blocks at the second computer.

2. The method of claim 1, wherein the first computer includes a client.

3. The method of claim 1, wherein the second computer includes a file server.

4. The method of claim 1, wherein the network includes a wide area network.

5. The method of claim 1, wherein a header is appended to the full data chunk, if it is determined that the data is to be compressed.

6. The method of claim 5, wherein the header is uncompressed.

7. The method of claim 6, further comprising appending at least one of the data blocks to an output buffer prior to transferring the portion of the data blocks constituting the full data chunk from the first computer to the second computer, the output buffer having a predetermined size corresponding to the predetermined size used by the storage application program of the first computer.

8. The method of claim 7, wherein the output buffer first receives the uncompressed header before receiving the at least one of the data blocks if the output buffer is a first output buffer in a series of output buffers associated with the full data chunk.

9. The method of claim 5, wherein the header indicates a compressed size of the data in the data blocks.

10. The method of claim 1, wherein the data is identified on the first computer, in response to a request received from the second computer via the network.

11. The method of claim 10, wherein the request indicates whether the data is to be compressed.

12. The method of claim 11, wherein the request indicates whether the data is to be compressed, utilizing a flag.

13. The method of claim 10, wherein a reply is sent from the first computer to the second computer, in response to the request.

14. The method of claim 13, wherein the reply indicates whether compression of the data is supported.

15. The method of claim 14, wherein the reply indicates whether compression of the data is supported, utilizing a flag.

16. The method of claim 15, wherein the reply is sent without the flag being set when the first computer does not support compression of the data, and the reply prompts a user at the second computer to be warned of a lack of compression capabilities on the first computer.

17. The method of claim 11, wherein the determination as to whether the data is to be compressed is based on the request.

18. The method of claim 1, wherein the transferring and the compressing are performed in parallel.

19. A system, comprising:
a first computer for:
identifying data to be stored, the data comprising a size different from a predetermined size used by a storage application of the first computer;
subdividing by the storage application the data into a plurality of data blocks to result in the plurality of data blocks comprising the predetermined size, if it is determined that the data is not to be compressed;
if it is determined that the data is to be compressed, compressing by the storage application the data to result in compressed data having a compressed size different from the predetermined size used by the storage application, and subdividing, by the storage application, the compressed data into a plurality of data blocks to result in the plurality of data blocks comprising the predetermined size;
determining that a portion of the data blocks are sufficient to constitute a full data chunk based on a predetermined size of the full data chunk; and
organizing the portion of the data blocks into the full data chunk; and
a second computer coupled to the first computer via a network for receiving the portion of the data blocks each comprising the predetermined size and constituting the full data chunk from the first computer using the storage application, for storing the plurality of data blocks at the second computer.

20. A method, comprising:
receiving a plurality of data blocks organized as a plurality of data chunks from a first computer at a second computer via a network, for being stored by the second computer, the plurality of data blocks comprising a predetermined size used by a storage application program of the first computer;
determining whether the data blocks are compressed;
if it is determined that the data blocks are compressed, whereby the compressed data blocks are generated by subdividing compressed data having a compressed size different from the predetermined size into the plurality of compressed data blocks to result in the plurality of compressed data blocks comprising the predetermined size, identifying a header associated with each data chunk that indicates a compressed size of data in the corresponding data blocks, decompressing, by the storage application program, the data blocks utilizing the header, and comparing the compressed size of the data blocks received with a length identified from the header for determining whether a full data chunk has been received; and
storing the data utilizing the second computer, in response to a determination that the full data chunk has been received;
wherein the decompressing is performed by a first layer associated with the storage application program, and the decompressing is transparent to one or more other layers associated with the storage application program.

21. The method of claim 20, wherein the first computer includes a client.

22. The method of claim 20, wherein the second computer includes a file server.

23. The method of claim 20, wherein the network includes a wide area network.

24. The method of claim 20, wherein the header is appended to each data chunk.

25. The method of claim 20, wherein the header is uncompressed.

26. The method of claim 20, wherein the data blocks are received from the first computer, in response to a request transmitted from the second computer to the first computer via the network.

27. The method of claim 26, wherein the request indicates whether the data is to be compressed.

28. The method of claim 27, wherein the request indicates whether the data is to be compressed, utilizing a flag.

29. The method of claim 27, wherein a reply is received from the first computer at the second computer, in response to the request.

30. The method of claim 29, wherein the reply indicates whether compression of the data is supported.

31. The method of claim 30, wherein the reply indicates whether compression of the data is supported, utilizing a flag.

32. The method of claim 30, wherein the determination as to whether the data blocks are compressed is based on the reply.

33. The method of claim 20, wherein the receiving and the decompressing are performed in parallel.

34. The method of claim 20, wherein the data is associated with a single file.

35. The method of claim 20, wherein the data is associated with a plurality of files.

36. A computer program product embodied on a non-transitory computer readable medium, comprising:
computer code for receiving a plurality of data blocks organized as a plurality of data chunks from a first computer at a second computer via a network, for being stored by the second computer, the plurality of data blocks comprising a predetermined size used by a storage application program of the second computer;

computer code for determining whether the data blocks are compressed;

computer code for identifying a header associated with each data chunk that indicates a compressed size of data in the corresponding data blocks, decompressing, by the storage application program, the data blocks utilizing the header, if it is determined that the data blocks are compressed, whereby the compressed data blocks are generated by subdividing compressed data having a compressed size different from the predetermined size into the plurality of compressed data blocks to result in the plurality of compressed data blocks comprising the predetermined size, and comparing the compressed size of the data blocks received with a length identified from the compression header for determining whether a full data chunk has been received; and computer code for storing the data utilizing the second computer, in response to a determination that the full data chunk has been received;

wherein the decompressing is performed by a first layer associated with the storage application program, and the decompressing is transparent to one or more other layers associated with the storage application program.

\* \* \* \* \*